Figure 1:
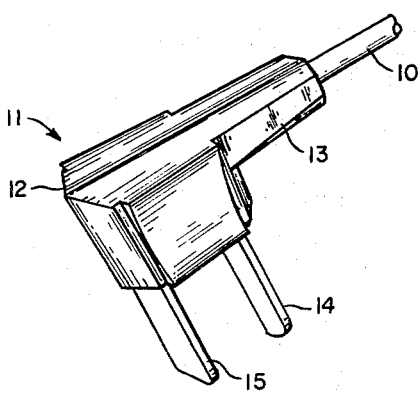

Sept. 27, 1960 W. R. KING 2,954,541
RIGHT ANGLE ELECTRICAL CONNECTOR
Filed Jan. 8, 1960

INVENTOR.
WILLIAM R. KING
BY
Francis A. Sim
ATTORNEY

United States Patent Office 2,954,541
Patented Sept. 27, 1960

2,954,541

RIGHT ANGLE ELECTRICAL CONNECTOR

William R. King, Denver, Colo., assignor to Minneapolis-Honeywell Regulator Company, Minneapolis, Minn., a corporation of Delaware Filed Jan. 8, 1960, Ser. No. 1,247

4 Claims. (Cl. 339—61)

The present invention is concerned with an improved right angle electrical connector and particularly a connector of the type adapted to be utilized as the basic end of a photographic shutter cord, adapted to connect a photographic flash unit to the camera shutter switch of a photographic camera.

It is conventional practice for the various manufacturers of photographic flash units to provide a polarized two socket type outlet of a conventional type which is adapted to receive a two prong polarized connector. This two prong polarized connector is commonly referred to as the basic end of the shutter cord since this end is usable with a majority of the photographic flash units.

In many cases, the photographic flash unit is an electronic type flash unit utilizing relatively high voltages to energize a gas filled flash tube, under the control of the shutter switch of an associated camera. These shutter switches are normally connected to the metal camera case held by the photographer, and therefore it is desirable to provide a polarized connection between the camera and the flash unit.

Furthermore, it is not unusual for the shutter cord to be placed under tension by the photographer as the photographer holds the flash unit at an arm's length from the camera. A right angle type connector, which includes a molded plug leading the shutter cord at right angles to the prongs of the connector, is utilized so that when this cord is placed under tension, the connector is normally not pulled out of the mating socket, unless excessive force is applied thereto.

With such a general type of construction, it has been found that the basic end of the shutter cord is subjected to frequent strain and bending. In the past, failure of the basic end of the shutter cord, due to breaking of the wire and the resulting circuit discontinuity, has frequently occurred.

The present invention is directed to an improved right angle electrical connector which is particularly adapted for use as a basic end of a photographic shutter cord, which connector is constructed and arranged so as to provide a new and novel strain relief arrangement, in combination with a novel configuration of molded plug so as to provide a durable resilient connector having an extended life, as compared to prior art connectors of this general type.

Specifically, the present invention provides a right angle electrical connector incorporating a two conductor cord and two metal connector prongs, the prongs being disposed at right angles to the cord and encased by a plug of resilient insulating material. The insulated cord is rigidly mounted to only one of the prongs and specifically to the prong which is located at the end of the cord. The other prong is located parallel to the first mentioned prong and spaced inward from the end of the conductor. This other prong is connected to the conductor only by means of a relatively long loop of wire which is formed by one of the conductors extending through the insulation of the cord. In this manner, a resilient mounting arrangement is achieved between the parts to allow relative movement between the cord and the second named prong while being attached firmly to the first named prong, for purposes of strain relief. Furthermore, the molded plug is provided with a neck portion to encase the cord for a distance leading away from the main portion of the plug which holds the prongs. This neck portion is of a tapering dimension to provide a support for the cord which is progressively more flexible from the point of clamping of the cord to the first named prong to the point where the cord leaves the neck portion of the plug. In this manner, the shear stresses which are built up in the cord as the cord is bent is distributed over a maximum length of the wire for a given size connector, and no one portion of the cord is subjected to excessive forces.

Figure 2:
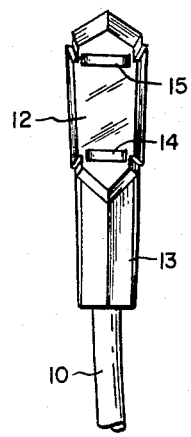
Figure 3:
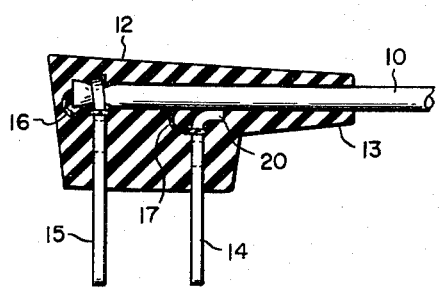
Figure 4:
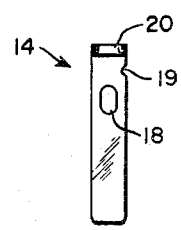
Figure 5:
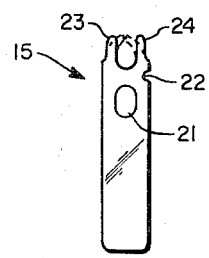
Figure 6:
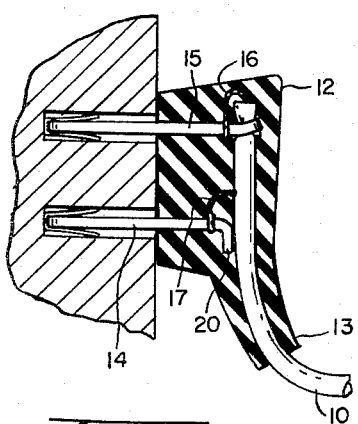

The present invention will be understood upon reference to the following specification, claims, and drawings, of which:

Figure 1 is a perspective view of the improved right angle electrical connector, Figure 2 is a bottom view of this connector showing the polarized prongs, Figure 3 is a section view showing the manner in which the prongs are connected to the two conductor cord and are encased or molded in a flexible plug, Figure 4 is a view of one of the connector prongs, Figure 5 is a view of the other connector prong, showing in broken lines the manner in which the strain relief clamping means is formed, and Figure 6 is a view similar to Figure 3 showing the electrical connector inserted in a mating socket, such as a photographic flash unit socket, wherein the two conductor cord is subjected to a normal operating condition placing the cord under a certain amount of strain.

Referring to Figure 1, reference numeral 10 designates a two conductor electrical cord having two metallic conductors which are insulated from each other and which are encased in a flexible insulating jacket, which jacket may be formed of rubber or of an insulating plastic having rubberlike characteristics.

Reference numeral 11 designates generally a molded plug which is also formed of rubber or of a rubberlike plastic. This molded plug includes a first main portion 12 making up the larger mass of the plug. It is this portion 12 which is adapted to be handled while the plug is being inserted or being removed from a mating socket connector. However, in many instances, the user of the connector removes the connector by pulling on cord 10, to cause a condition similar to that shown in Figure 6 to exist.

Reference numeral 13 designates a neck portion which in the preferred embodiment is shown as being tapered away from the main portion 12 of the connector. This can be seen more clearly in Figures 3 and 6, and in Figure 6 it can be seen that when a strain is placed on cord 10, the resilient plug material flexes and is progressively more flexible toward the end of the plug to thereby distribute the stresses built up in the cord in an even fashion along the plug, and thereby reduce and evenly distribute the shearing load applied at any one point along the cord.

Reference numerals 14 and 15 designate first and second metallic connector prongs which are connected one to each of the two flexible metallic conductors 17 and 16 within the cord 10, as is shown in Figure 3. The connector prongs 14 and 15 are formed as a flat elongated metal member, and as can be seen in Figure 2, the resulting connector is a polarized connector by virtue of the fact that prong 15 is somewhat wider than prong 14. The socket connectors normally utilized in electronic photographic flash units have similar dimensions wherein one of the sockets is small and will receive only prong 14.

The individual prongs 14 and 15 are shown in Figures 4 and 5 respectively. In Figure 4 it can be seen that prong 14 is provided with an opening 18 and a notch 19. Opening 18 is provided as a means of anchoring prong 14 within the molded plug 11. During the molding process, the molding material enters opening 18 and thereby holds the prong within the plug. Notch 19 formed in the side of the plug is provided to receive the metallic conductor 17 and this conductor is then soldered in position to complete the electrical connection. This in fact is the only physical connection between cord 10 and the first prong 14. Thus, relative movement can take place between cord 10 and prong 14, as is shown in Figure 6. Wire 17 is connected to prong 14 by means of a relatively long loop of wire to insure that no force is built up between cord 10 and prong 14, as the cord is subjected to bending stresses or the like. In this manner, there is no tendency for the conductors within the cord 10 to break off at or near this prong. While the cord is electrically connected to prong 14, the actual physical connection is such that little or no stress is set up in the cord when the cord is subjected to bending forces, such as illustrated in Figure 6.

Reference numeral 20 of Figures 3, 4 and 6 designate a right angle tab which is formed at one end of prong 14. This tab is utilized to position the prong within the molded plug, at substantially a right angle to cord 10.

Figure 5 discloses the second metallic connector prong and this prong is also formed of a flat elongated metal member which is provided with an opening 21 similar to the opening 18 in member 14, and with a notch 22 similar to the notch 19 in member 14. The opening 21 is utilized to firmly hold or anchor this prong in the molded plug, and notch 22 is utilized to receive conductor 16, this conductor being soldered in position.

The reference numerals 23 and 24 identify two tabs which constitute a bifurcated end, constituting cord clamping means adapted to be bent as shown in the dotted line position of Figure 5 to firmly clamp the insulating jacket of cord 10, as illustrated in Figures 3 and 6, and thereby provide a strain relief arrangement whereby excessive strain within cord 10 is taken up by means of the mechanical connection to prong 15 and this stress is therefore not built up in conductors 16 and 17. The improved electrical connector, as above described, provides an arrangement whereby the prongs of the connector are disposed generally parallel to each other and at right angles to the cord. Furthermore, the cord is mechanically connected to that prong which is disposed the greatest distance from the exit of the cord from the molded plug. In this manner, the shearing stress built up in the cord due to bending thereof is distributed over a maximum length of the cord, and under normal operating conditions no one point is subjected to a force sufficient to cause the cord to fail. Furthermore, the molded plug, which of course must be kept within reasonable dimensions, is provided with a tapered neck extending away from the main body of the plug and this tapered neck is progressively more flexible toward the exit of the cord from the neck, thereby distributing forces built up in the cord over an even greater distance along the cord. While the right angle connector of the present invention utilizes two metallic prongs, the prong which is spaced inwardly from the end of the cord is not mechanically connected to the cord except by way of a relatively long loop of wire formed as one of the conductors extends out of the insulated jacket and makes connection with this prong. Therefore, little or no mechanical stress is built up between the cord and this particular prong.

The above constitutes a detailed explanation of the preferred modification of the present invention and it is intended that the scope of this invention be limited solely by the scope of the appended claims.

I claim as my invention:

1. In combination, a two conductor cord having two metallic conductors which are encased in a flexible insulating jacket; a first connector prong formed of a flat elongated metal member, said first prong being disposed along said cord at a position spaced from the end of said cord and being connected to said cord only by virtue of a connection to one of said metallic conductors which extends through said insulating jacket; a second connector prong formed of a flat elongated metal member having tabs formed at one end thereof, said second prong being rigidly mounted at said end of said cord by means of said tabs which are bent to firmly clamp said insulating jacket to provide strain relief and to position said second prong at a right angle to said cord, means connecting the other of said metallic conductors to said second prong, and a molded connector plug having a solid body of flexible insulating material which encases said first and second prongs to support said prongs in a spaced parallel relationship with both of said prongs being at right angles to said cord, said cord thereby being resiliently supported against bending and the like and being firmly clamped only by virtue of its connection to said second prong, which prong is disposed the greatest distance from the exit of said cord from said plug.

2. A right angle electrical connector, comprising; a two conductor cord having two metallic conductors which are encased in a flexible insulating jacket; a first connector prong formed of a flat elongated metallic member, said first prong being disposed along said cord spaced from the end thereof and connected to said cord only by virtue of a loop of wire formed by one of said metallic conductors which extends through said insulating jacket, said loop of wire permitting relative movement between said cord and said first prong; a second prong formed of a flat elongated metal member having a pair of spaced projections at one end thereof, said second prong being firmly mounted on said end of said cord by means of said spaced projections which partially surround the insulating jacket of said cord and are then bent to clamp said second prong thereto to provide strain relief in the event of forces applied to said cord, and to position said second prong at right angle to said cord, means connecting the other of said metallic conductors to said second prong by means of a loop of wire; and a molded connector plug having a solid body of insulating material and having a first portion which encases said first and second prongs to support said prongs in spaced parallel relationship with both of said prongs at right angles to said cord, said plug having a second portion which extends as a neck away from said first portion and encases said cord to provide a resilient support for said cord to distribute strain on said cord from the point where said cord leaves said neck to said second prong.

3. A right angle photographic shutter cord basic end, comprising; a two conductor cord having two flexible metallic conductors which are encased in a flexible insulating cover; a first metallic prong having a flat elongated portion, one end of which is adapted to mate with the socket connector of a photographic flash unit and the other end of which is provided with an opening extending through said first prong, a tab extending at a right angle to said elongated portion, said first prong being disposed along said cord, spaced from the end of said cord, and fastened to said cord only by virtue of a relatively long loop of wire which is formed by one of said metallic conductors extending through said cover; a second metallic prong having a flat elongated portion, one end of which is adapted to mate with the socket connector of a photographic flash unit, the other end of which is provided with an opening extending through said second prong and with cord clamping means, said second prong being firmly mounted at said end of said cord by means of said clamping means to provide strain relief for said cord and position said second prong at a right angle to said cord, means connecting the other of said metallic conductors to said second prong by means of a relatively long loop of wire formed in said other conductor; and a molded connector plug having a solid body of flexible insulating material which encases said first and second prongs and an end portion of said cord to support said prongs in spaced parallel relationship with both of said prongs at right angles to said cord, said end portion of said cord being resiliently supported as a protection against bending and the like and being clamped only by said second prong which is disposed the greatest distance from the exit of said cord from said connector plug.

4. A two prong right angle connector, comprising; a two conductor electrical cord having two metallic conductors which are encased in a flexible insulating jacket; a first elongated connector prong having a first end adapted to act as a contact and having a second end disposed near one end of said cord and connected thereto only by virtue of a loop of wire which is formed by one of said conductors extending through said insulating jacket, to thereby permit relative movement between said cord and said second end; a second elongated connector prong having a first end adapted to act as a contact and having a second end formed with bifurcated cord clamping means to mount said second prong firmly on said cord at said one end to provide strain relief and to position said second prong perpendicular to said cord, means connecting the other of said conductors to said second prong; a molded connector plug having a solid body of flexible insulating material which encases said first and second prongs and a portion of said cord to support said prongs in a spaced parallel relationship perpendicular to said cord, and a tapered neck formed as a portion of said plug to encase and support a further portion of said cord as said cord extends away from said prongs to thereby provide a support for said cord which is progressively more flexible from the point of clamping of said cord to said second prong.

References Cited in the file of this patent

UNITED STATES PATENTS

| | | |
|---|---|---|
| 2,542,609 | Wyglendowski | Feb. 20, 1951 |
| 2,651,764 | Felts et al. | Sept. 8, 1953 |
| 2,700,206 | Gilbert | Jan. 25, 1955 |

FOREIGN PATENTS

| | | |
|---|---|---|
| 739,759 | Great Britain | Nov. 2, 1955 |